(12) United States Patent
Kabeta et al.

(10) Patent No.: US 6,999,249 B2
(45) Date of Patent: Feb. 14, 2006

(54) LENS

(75) Inventors: Atsuo Kabeta, Tochigi-ken (JP);
Kazuhiro Yamada, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/675,995

(22) Filed: Oct. 2, 2003

(65) Prior Publication Data

US 2004/0066560 A1   Apr. 8, 2004

(30) Foreign Application Priority Data

Oct. 2, 2002  (JP) .............................. 2002-289785

(51) Int. Cl.
*G02B 7/02* (2006.01)
(52) U.S. Cl. ..................... 359/811; 359/819; 362/455; 353/100
(58) Field of Classification Search ............... 359/642, 359/804, 811, 819; 351/159, 174; 362/455; 353/100
See application file for complete search history.

(56) References Cited

U.S. PATENT DOCUMENTS 4,662,717 A * 5/1987 Yamada et al. ............. 359/362
5,116,644 A    5/1992 Asai et al. .................. 427/164
5,181,142 A    1/1993 Asai et al. .................. 359/581
5,246,634 A * 9/1993 Ichikawa et al. ............ 264/1.7
5,257,145 A * 10/1993 Kanazawa et al. .......... 359/819
5,361,168 A * 11/1994 Arai et al. .................. 359/796
2004/0179277 A1 * 9/2004 Stallard et al. .............. 359/811

FOREIGN PATENT DOCUMENTS

| JP | 2000-189884 | 7/2000 |
| JP | 2000-202355 | 7/2000 |
| JP | 2000-210614 | 8/2000 |

\* cited by examiner

Primary Examiner—Scott J. Sugarman
Assistant Examiner—Darryl J. Collins
(74) Attorney, Agent, or Firm—Greenblum & Bernstein, P.L.C.

(57) ABSTRACT

Disclosed is a lens, which has a convex surface, a concave surface and a flange that is formed around the lens to be projected in a radial direction perpendicular to an optical axis and to be continued from the convex surface. The flange is provided with a groove formed on the side of the convex surface that extends from the outer edge of the convex surface toward the outer edge of the flange. When the lens is pulled up from a solution of coating material, the unnecessary solution that collects at a lower area of the convex surface drips from the lens through the groove. This prevents a formation of a puddle on the convex surface.

11 Claims, 12 Drawing Sheets

Width of puddle

Height of puddle

LENS

BACKGROUND OF THE INVENTION

The present invention relates to a lens whose at least one lens surface is a convex surface. Particularly, the present invention relates to a shape of a lens that is suitable for coating.

In general, a lens surface is covered with a protective coating that prevents a scratch (for example, see Japanese patent publication No. P2000-210614A).

A procedure to apply this kind of coating is as follows.
(1) Hung a lens so that the optical axis keeps level.
(2) Immerse the lens into a solution of coating material and leave the lens in the solution for a predetermined period.
(3) Pull up the lens from the solution at a predetermined pulling-up speed.
(4) Cure the solution adhered to the lens surface by predetermined curing methods (heating or irradiating ultraviolet rays).

However, an application of the above-described coating to a lens having a flange, which is formed around the lens to be projected in a radial direction perpendicular to an optical axis and to be continued from a convex surface, causes the following problem.

That is, the solution collects at a lower area of the convex surface inside the flange by influence of gravity when the lens is pulled up from the solution after the immersion in the solution. The collection of the solution is referred to as "a puddle" in the following description.

Since a puddle remains after the curing, the thickness of the coating, which should become uniform, increases only in the lower area due to the puddle. This partially changes refractive power of the lens, which distorts an image when the lens is applied to an imaging optical system, for example.

SUMMARY OF THE INVENTION

It is therefore an object of the present invention to provide a lens whose at least one lens surface is a convex surface with a flange around it, which is capable of reducing a size of a puddle formed on the convex surface after the lens is immersed in a solution of coating material.

For the above object, according to the present invention, there is provided a lens, which has: a first lens surface; a second lens surface, at least one of the first and second lens surfaces is a convex surface; and a flange that is formed around the lens to be projected in a radial direction perpendicular to an optical axis and to be continued from the convex surface. The flange is provided with a groove formed on the side of the convex surface that extends from the outer edge of the convex surface toward the outer edge of the flange.

For applying a coating to the lens, hung the lens so that the groove is directed downward, immerse the lens in a solution of coating material, and pull up the lens from the solution after a lapse of a predetermined immersion time. Where the lens is pulled up, the unnecessary solution, which collects at a lower area of the convex surface inside the flange by influence of gravity, drips from the lens through the groove formed on the flange. This reduces a size of a puddle formed on the convex surface.

Therefore, the solution adhered to the lens surface forms a coating layer having almost uniform thickness after curing.

The flange may include an outer ring area and an inner ring area that are different in thickness in the optical axis direction. In such a case, the groove may be formed so as to cut a part of the outer and inner ring areas. The thickness of the outer ring area in the optical axis direction may be larger than that of the inner ring area.

It is preferable that the depth of the groove with reference to the inner ring area is about twice the differential step between the outer and inner ring areas.

Further, the width of the outer ring area in the radial direction may be larger than that of the inner ring area. Specifically, the width of the outer ring area in the radial direction may be more than twice and less than three times that of the inner ring area.

It is preferable that the width of the groove in the tangential direction is larger than the width of the flange in the radial direction. In addition, the width of the groove in the tangential direction is preferably smaller than twice the width of the flange in the radial direction.

DESCRIPTION OF THE ACCOMPANYING DRAWINGS

DESCRIPTION OF THE EMBODIMENTS

Figure 1:
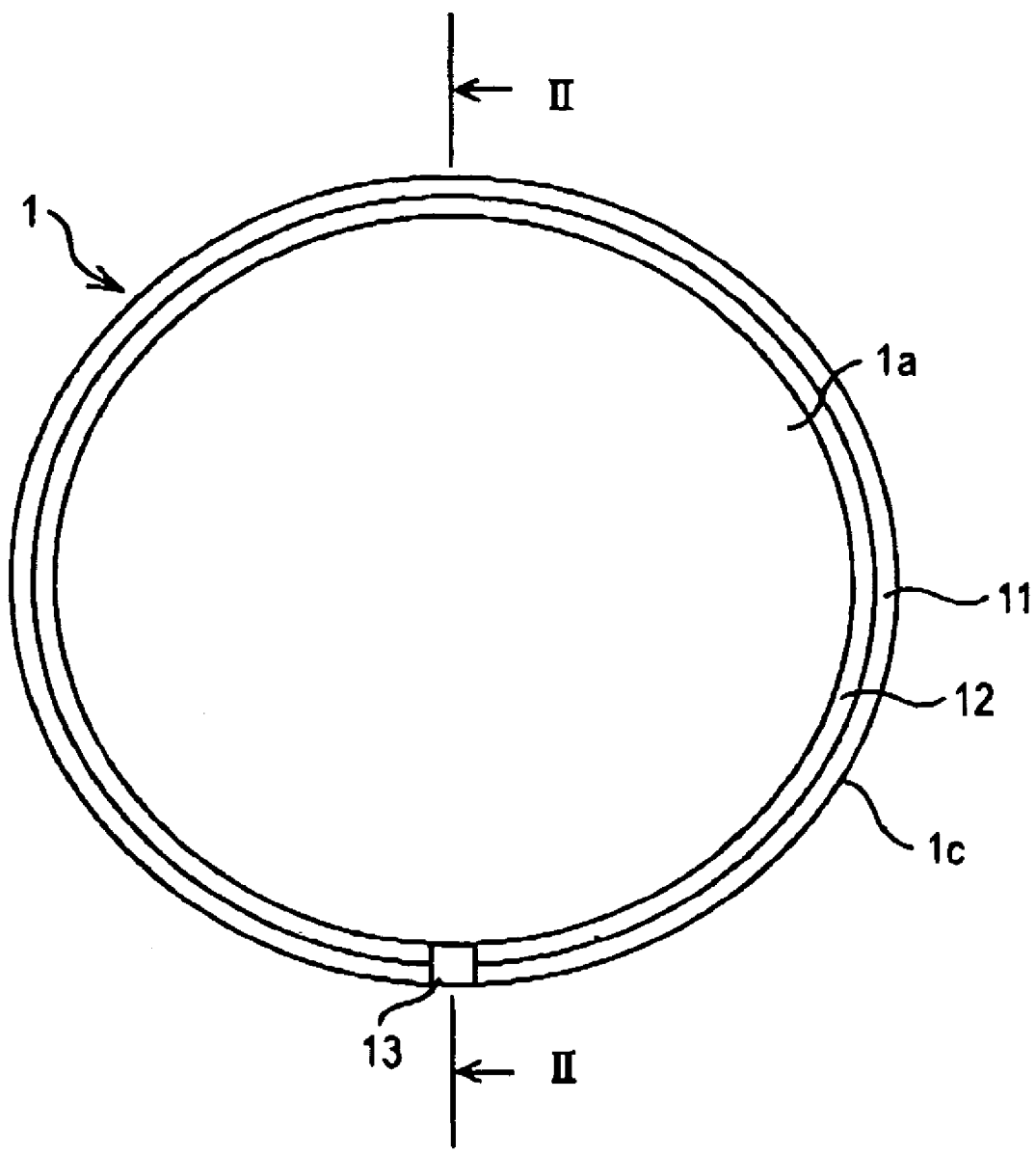
FIG. 1 is a front view of a lens of an embodiment according to the present invention.

An embodiment of the present invention will be described with reference to drawings. FIG. 1 is a front view of a lens 1 of the embodiment according to the present invention and FIG. 2 is a cross sectional view along a II—II line in FIG. 1.

Figure 2:
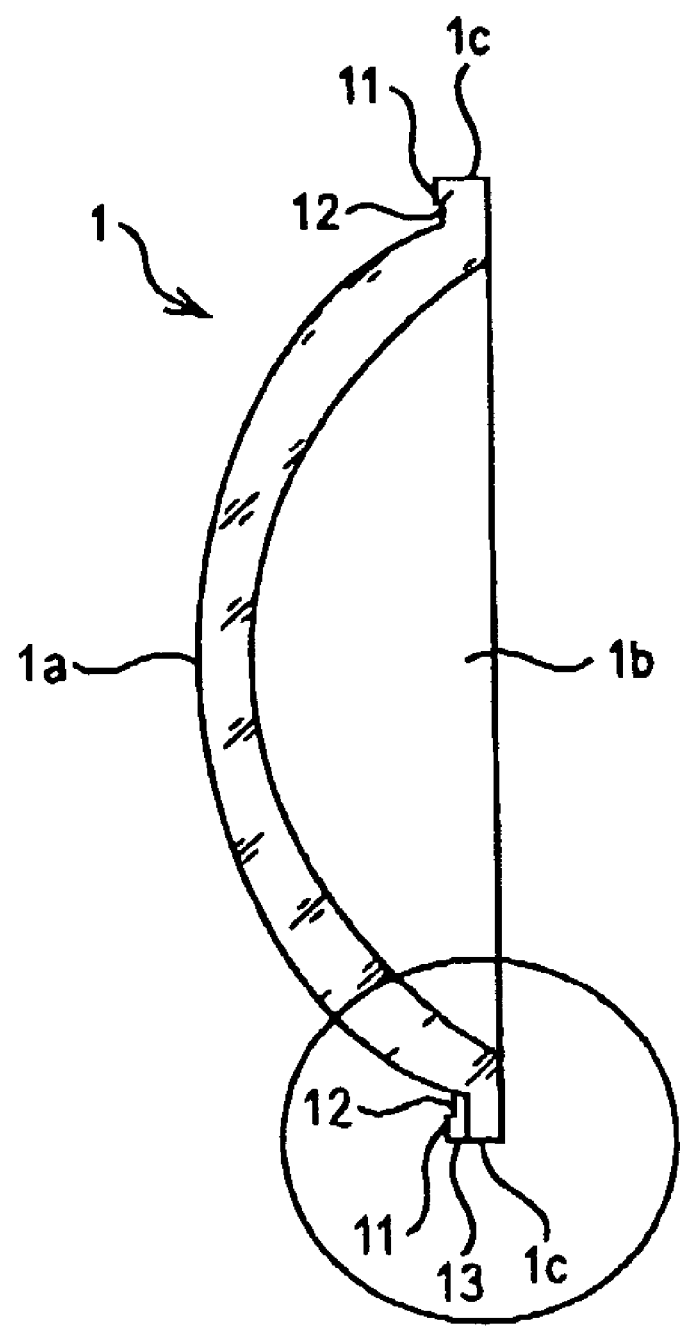
FIG. 2 is a cross sectional view along a II—II line in FIG. 1.

As shown in FIG. 1 and FIG. 2, the lens 1 of the embodiment is a meniscus lens whose first lens surface is a convex surface 1a and whose second lens surface is a concave surface 1b. A flange 1c is formed around the lens 1 to be projected in a radial direction perpendicular to an optical axis and to be continued from the convex surface 1a. The flange 1c becomes an mounting member when the lens 1 is installed in an optical device.

Two ring areas, an outer ring area 11 and an inner ring area 12 are formed on a surface of the flange 1c to be continued to the convex surface 1a.

Figure 3:
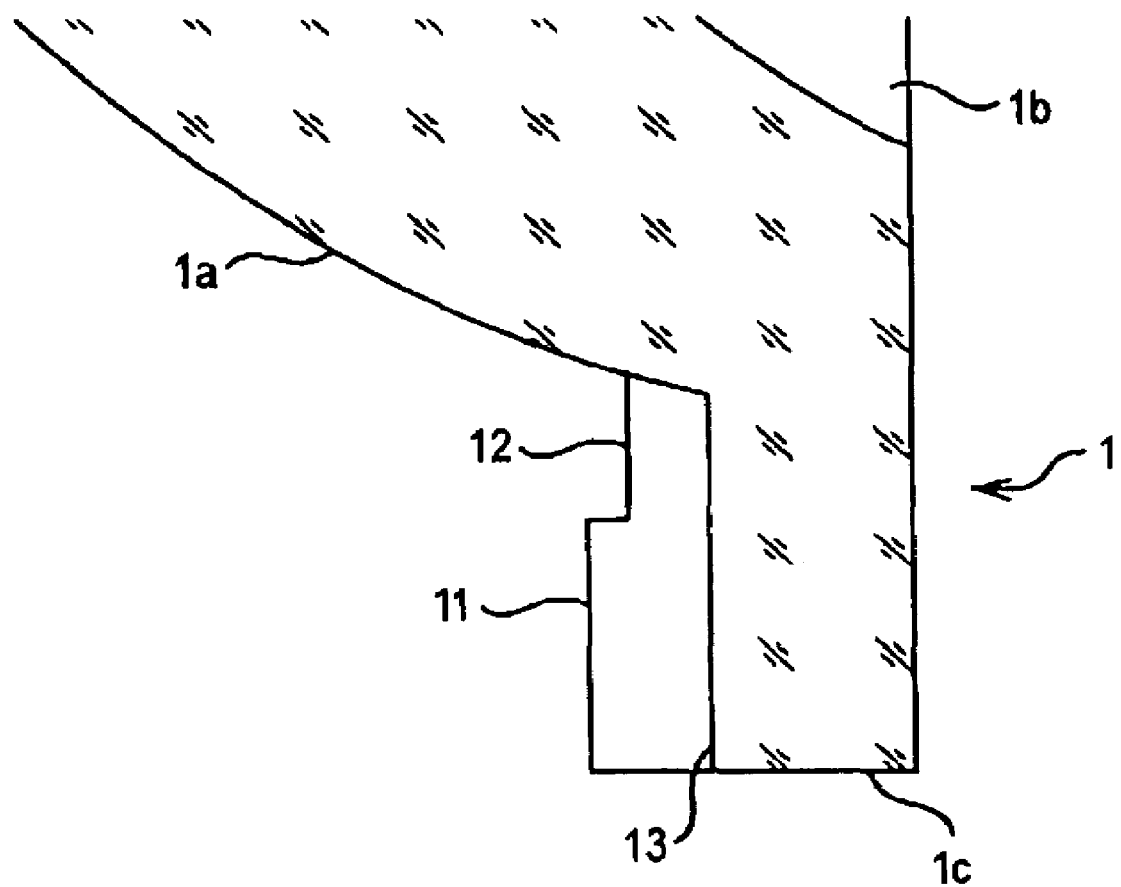
FIG. 3 is an enlarged view of a part surrounded by a circle in FIG. 2.

FIG. 3 is an enlarged view of a part surrounded by a circle in FIG. 2. As shown in FIG. 3, the outer ring area 11 and the inner ring area 12 are different in thickness in the optical axis direction. The thickness of the outer ring area 11 in the optical axis direction is larger than that of the inner ring area 12.

Further, the dimension of the differential step between the outer and inner ring areas 11 and 12 is exaggerated for purposes of illustration as compared with the dimensions of the other portions in FIG. 3 (ditto for FIGS. 6, 8, 10, 12, 14, 16, 18 and 20).

Still further, the width of the outer ring area 11 in the radial direction is set to be larger than that of the inner ring area 12. Specifically, the width of the outer ring area 11 in the radial direction is more than twice and less than three times that of the inner ring area 12.

A groove 13 is formed in a part of the surface of the flange 1c that is continued to the convex surface 1a. The groove 13 has a rectangular shape in the front view as shown in FIG. 1 and extends from the outer edge of the convex surface 1a toward the outer edge of the flange 1c so as to cut a part of the outer and inner ring areas 11 and 12.

The depth of the groove 13 with reference to the inner ring area 12 is about twice the differential step between the outer and inner ring areas 11 and 12 in the optical axis direction.

Further, the width of the groove 13 in the tangential direction is larger than the width of the flange 1c in the radial direction. In addition, the width of the groove 13 in the tangential direction is smaller than twice the width of the flange 1c in the radial direction. As shown in FIG. 3, the convex surface 1a is extended to the bottom surface of the groove 13.

Furthermore, a protective coating (not shown) that prevents a scratch is applied to the surfaces of the lens 1. A procedure to apply the coating is as follows.

(1) Hung the lens 1 so that the optical axis keeps level and that the groove 13 is directed downward.
(2) Immerse the lens 1 into a solution of coating material and leave it in the solution for a predetermined period.
(3) Pull up the lens 1 from the solution at a predetermined pulling-up speed.
(4) Cure the solution adhered to the lens surfaces 1a and 1b by predetermined curing methods (heating or irradiating ultraviolet rays).

When the lens 1 is pulled up at the process (3), the unnecessary solution, which collects at a lower area of the convex surface 1a inside the flange 1c by influence of gravity, drips from the lens 1 through the groove 13 formed on the flange 1c. This reduces a size of a puddle formed on the convex surface 1a.

As a result, the solution adhered to the lens 1 forms a coating layer having almost uniform thickness after curing according to the embodiment. Therefore, the lens 1 with coating layer does not distort an image when the lens 1 is applied to an imaging optical system.

Next, a numerical example of the embodiment and seven comparative examples will be described to compare effects thereof.

Figure 4:
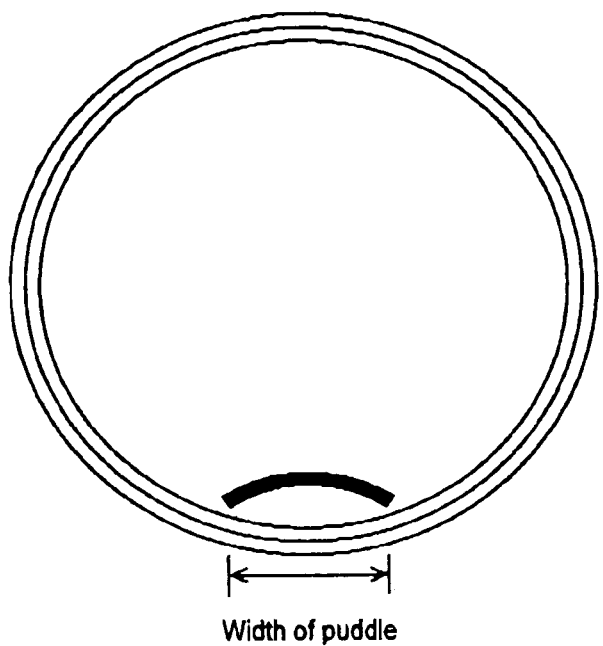
FIG. 4 and FIG. 5 are illustrations to explain a measurement method of a puddle.
Figure 5:
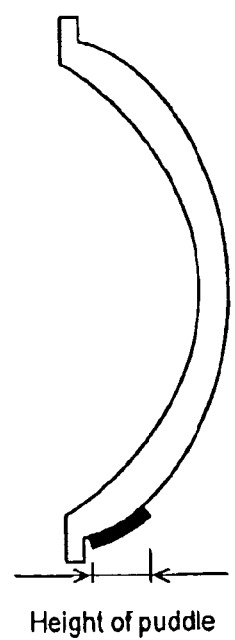

First, a measurement method of a puddle formed on a convex surface 1a when the coating is applied is described with reference to FIG. 4 and FIG. 5. Outlines of the puddle are illustrated by bold lines in FIG. 4 and FIG. 5. As shown in these drawings, a width of the puddle in the tangential direction viewed from the front of the lens is referred to as a "Width of puddle" and a width of the puddle in the radial direction viewed from the side of the lens is referred to as a "Height of puddle".

Figure 6:
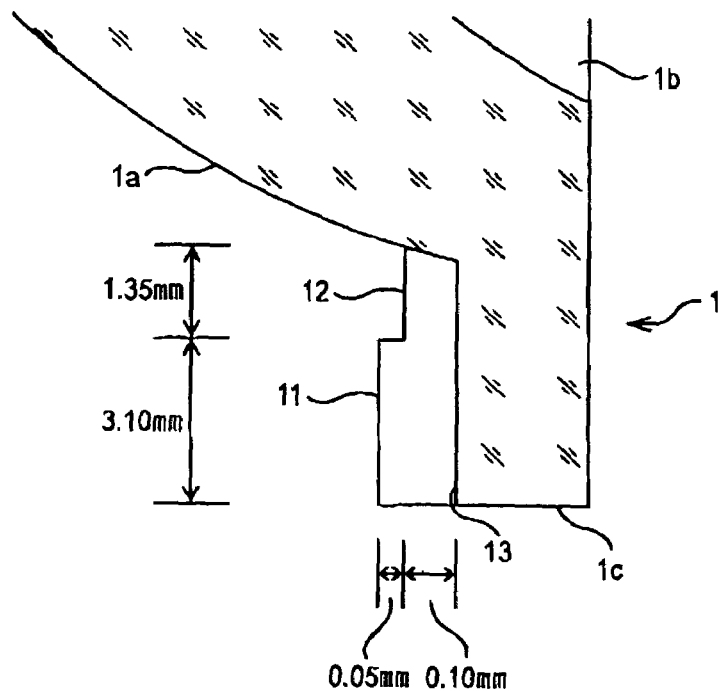
FIG. 6 is an enlarged sectional view, which is the same as FIG. 3, showing numerical values of the embodiment.
Figure 7:
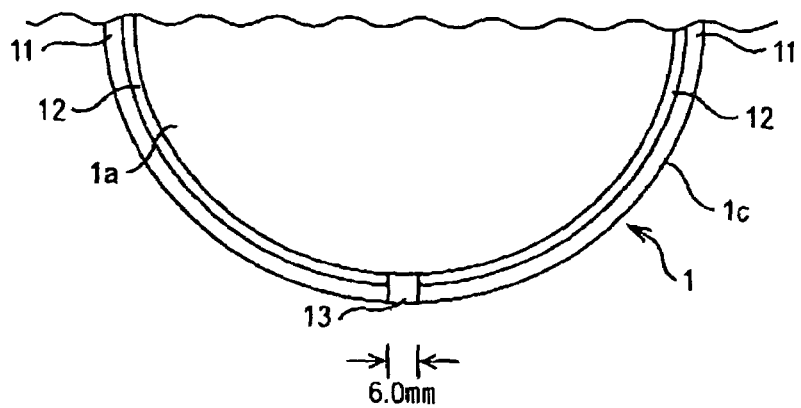
FIG. 7 is a front view of the lower half of the lens when it is viewed from the left in FIG. 6.

FIG. 6 is an enlarged sectional view of the part of the flange 1c of the embodiment and FIG. 7 is a front view of the lower half of the lens 1 in a pulling-up direction when it is viewed from the left in FIG. 6.

As shown in FIG. 6 and FIG. 7, the width from the outer edge of the convex surface 1a toward the outer edge of the flange 1c in the radial direction is equal to 4.45 mm, the width of the outer ring area 11 in the radial direction is equal to 3.10 mm and the width of the inner ring area 12 in the radial direction is equal to 1.35 mm. Further, the differential step between the outer and inner ring areas 11 and 12 in the optical axis direction is equal to 0.05 mm. Still further, the depth of the groove 13 with reference to the inner ring area 12 is equal to 0.10 mm and the width of the groove 13 in the tangential direction is equal to 6.0 mm. The width of the groove 13 in the tangential direction preferably falls in the rage of 1 mm to 15 mm in order to allow a smooth flow of the unnecessary solution of the coating material. Further, the number of the groove 13 is not limited. When a plurality of grooves are formed, it is preferable that the total width of the grooves falls in the above range.

When a solution of coating material was applied to the lens 1 of the embodiment according to the above-described procedure, the width of puddle became 18 mm through 55 mm and the height of puddle became 1.5 mm.

Next, the seven comparative examples will be described with reference to FIG. 8 through FIG. 21. The basic construction of the comparative examples are similar to the embodiment. That is, the lenses (2, 3, 4, 5, 6, 7 and 8) of the comparative examples are also meniscus lenses having convex first surfaces (2a, 3a, 4a, 5a, 6a, 7a and 8a) and concave second surfaces (2b, 3b, 4b, 5b, 6b, 7b and 8b) with flanges (2c, 3c, 4c, 5c, 6c, 7c and 8c), the width from the outer edge of the convex surface toward the outer edge of the flange in the radial direction is equal to 4.45 mm, and the widths of the outer and inner ring areas in the radial direction are 3.10 mm and 1.35 mm, respectively, in the same manner as the embodiment. However, the comparative examples are different from the embodiment in a shape of the surface of the flange continued to the convex surface. Only difference from the above-described embodiment will be explained as follows.

FIRST COMPARATIVE EXAMPLE

Figure 8:
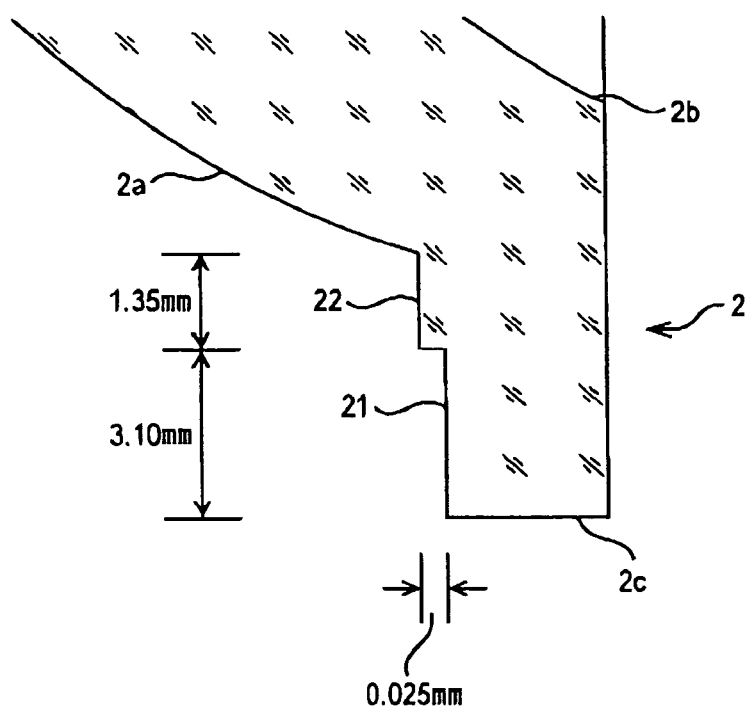
FIG. 8 is an enlarged sectional view of a fringe part of a lens of a first comparative example.
Figure 9:
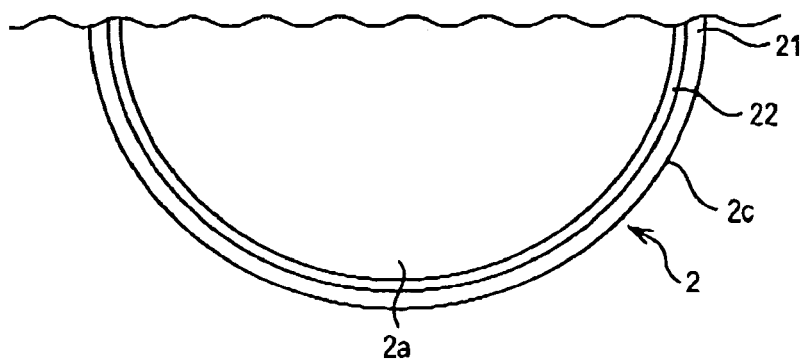
FIG. 9 is a front view of the lower half of the lens of the first comparative example when it is viewed from the left in FIG. 8.

FIG. 8 is an enlarged sectional view of the part of the flange 2c of the first comparative example and FIG. 9 is a front view of the lower half of the lens 2 in a pulling-up direction when it is viewed from the left in FIG. 8.

As shown in FIG. 8 and FIG. 9, the lens 2 of the first comparative example differs form the lens 1 of the embodiment in that the lens 2 does not have a groove and the thickness of the inner ring area 22 in the optical axis direction is larger than that of the outer ring area 21.

The differential step between the outer ring area 21 and the inner ring area 22 in the optical axis direction is equal to 0.025 mm.

When a solution of coating material was applied to the lens 2 of the first comparative example according to the above-described procedure, the width of puddle became 50 mm and the height of puddle became 3.5 mm.

SECOND COMPARATIVE EXAMPLE

Figure 10:
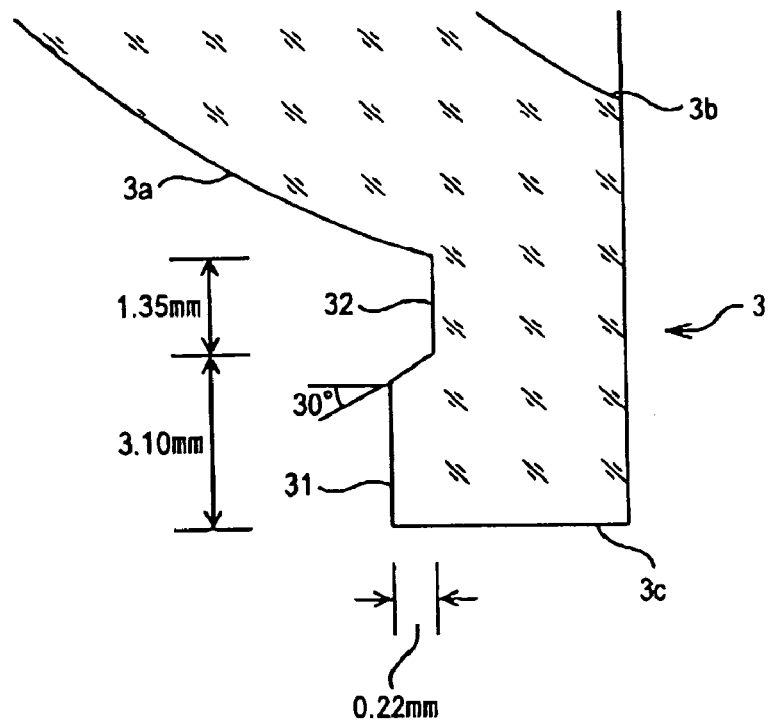
FIG. 10 is an enlarged sectional view of a fringe part of a lens of a second comparative example.
Figure 11:
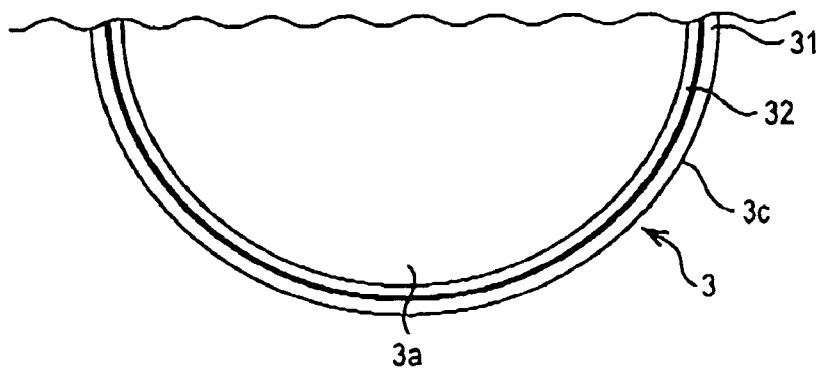
FIG. 11 is a front view of the lower half of the lens of the second comparative example when it is viewed from the left in FIG. 10.

FIG. 10 is an enlarged sectional view of the part of the flange 3c of the second comparative example and FIG. 11 is a front view of the lower half of the lens 3 in a pulling-up direction when it is viewed from the left in FIG. 10.

As shown in FIG. 10 and FIG. 11, the lens 3 of the second comparative example differs form the lens 1 of the embodiment in that the lens 3 does not have a groove, the differential step between the outer and inner ring areas 31 and 32 in the optical axis direction is larger and a slant surface is formed between the outer and inner ring areas 31 and 32.

The angle of the slant surface with respect to the optical axis is 30 degrees and the differential step between the outer ring area 31 and the inner ring area 32 in the optical axis direction is equal to 0.22 mm.

When a solution of coating material was applied to the lens 3 of the second comparative example according to the above-described procedure, the width of puddle became 30 mm and the height of puddle became 3.5 mm.

THIRD COMPARATIVE EXAMPLE

Figure 12:
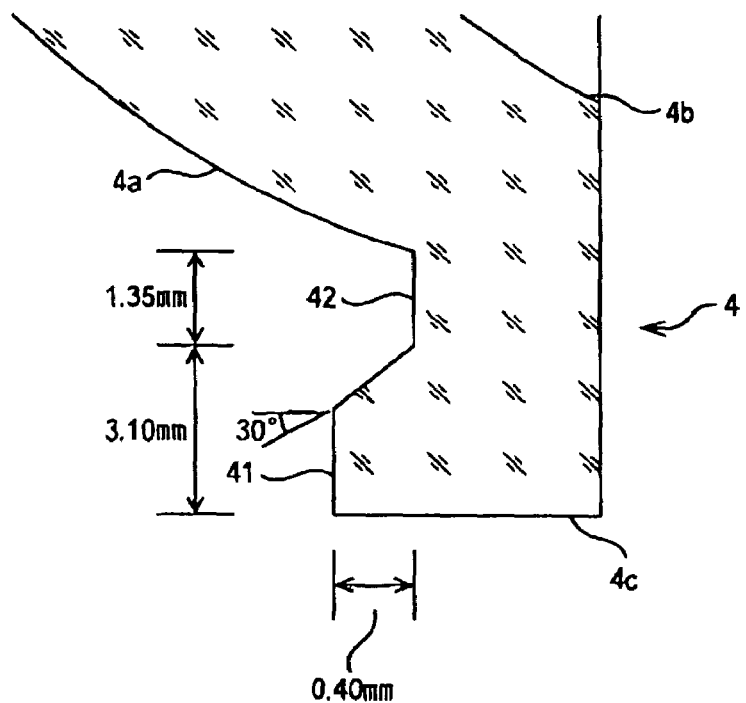
FIG. 12 is an enlarged sectional view of a fringe part of a lens of a third comparative example.
Figure 13:
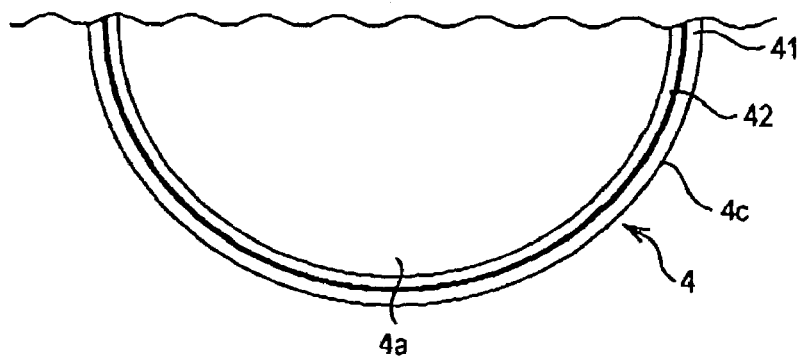
FIG. 13 is a front view of the lower half of the lens of the third comparative example when it is viewed from the left in FIG. 12.

FIG. 12 is an enlarged sectional view of the part of the flange 4c of the third comparative example and FIG. 13 is a front view of the lower half of the lens 4 in a pulling-up direction when it is viewed from the left in FIG. 12.

As shown in FIG. 12 and FIG. 13, the lens 4 of the third comparative example differs form the lens 1 of the embodiment in that the lens 4 does not have a groove, the differential step between the outer and inner ring areas 41 and 42 in the optical axis direction is larger and a slant surface is formed between the outer and inner ring areas 41 and 42.

The angle of the slant surface with respect to the optical axis is 30 degrees and the differential step between the outer ring area 41 and the inner ring area 42 in the optical axis direction is equal to 0.40 mm.

When a solution of coating material was applied to the lens 4 of the third comparative example according to the above-described procedure, the width of puddle became 25 mm through 50 mm and the height of puddle became 2.0 mm through 3.0 mm.

FOURTH COMPARATIVE EXAMPLE

Figure 14:
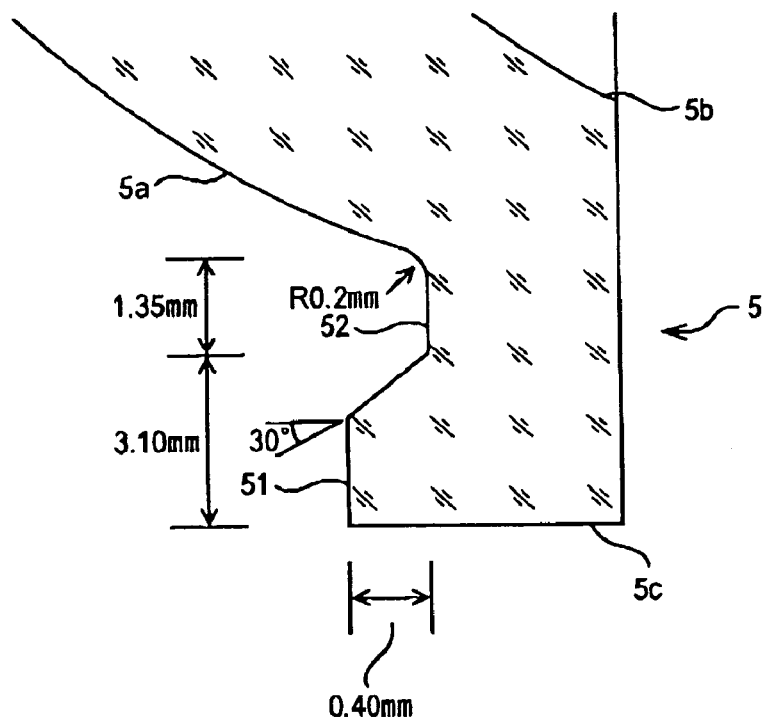
FIG. 14 is an enlarged sectional view of a fringe part of a lens of a fourth comparative example.
Figure 15:
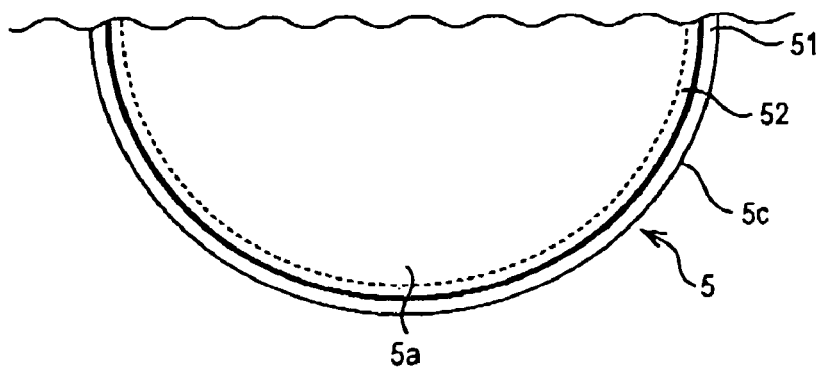
FIG. 15 is a front view of the lower half of the lens of the fourth comparative example when it is viewed from the left in FIG. 14.

FIG. 14 is an enlarged sectional view of the part of the flange 5c of the fourth comparative example and FIG. 15 is a front view of the lower half of the lens 5 in a pulling-up direction when it is viewed from the left in FIG. 14.

As shown in FIG. 14 and FIG. 15, the lens 5 of the fourth comparative example differs form the lens 1 of the embodiment in that the lens 5 does not have a groove, the differential step between the outer and inner ring areas 51 and 52 in the optical axis direction is larger, a slant surface is formed between the outer and inner ring areas 51 and 52, and the boundary between the convex surface 5a and the inner ring area 52 is rounded to smoothly connect them.

The angle of the slant surface with respect to the optical axis is 30 degrees, the differential step between the outer ring area 51 and the inner ring area 52 in the optical axis direction is equal to 0.40 mm and the radius of the rounded portion is equal to 0.2 mm.

When a solution of coating material was applied to the lens 5 of the fourth comparative example according to the above-described procedure, the width of puddle became 20 mm and the height of puddle became 3.0 mm.

FIFTH COMPARATIVE EXAMPLE

Figure 16:
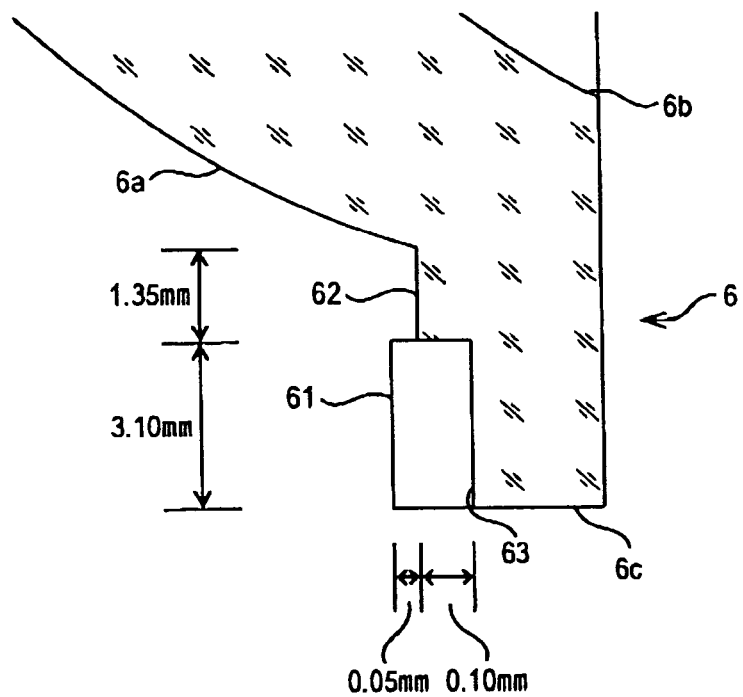
FIG. 16 is an enlarged sectional view of a fringe part of a lens of a fifth comparative example.
Figure 17:
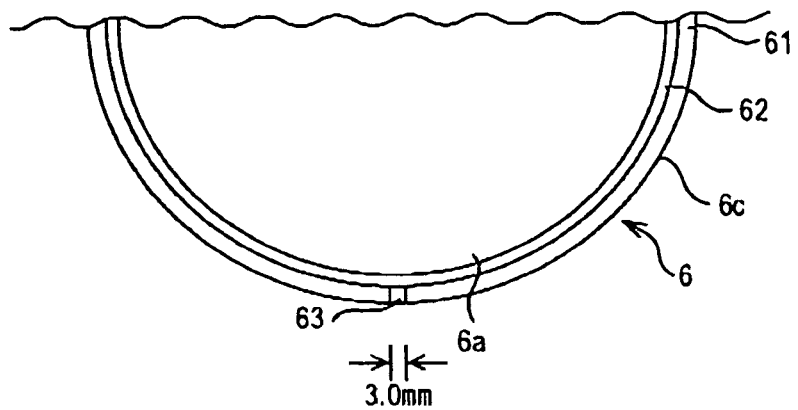
FIG. 17 is a front view of the lower half of the lens of the fifth comparative example when it is viewed from the left in FIG. 16.

FIG. 16 is an enlarged sectional view of the part of the flange 6c of the fifth comparative example and FIG. 17 is a front view of the lower half of the lens 6 in a pulling-up direction when it is viewed from the left in FIG. 16.

As shown in FIG. 16 and FIG. 17, the lens 6 of the fifth comparative example differs form the lens 1 of the embodiment in that a groove 63 on the flange 6c is formed so as to cut the outer ring area 61 only and the width of the groove 63 is smaller.

The differential step between the outer ring area 61 and the inner ring area 62 in the optical axis direction is equal to 0.05 mm, the depth of the groove 63 with reference to the inner ring area 62 is equal to 0.10 mm and the width of the groove 63 in the tangential direction is equal to 3.0 mm.

When a solution of coating material was applied to the lens 6 of the fifth comparative example according to the above-described procedure, the width of puddle became 50 mm and the height of puddle became 3.5 mm.

SIXTH COMPARATIVE EXAMPLE

Figure 18:
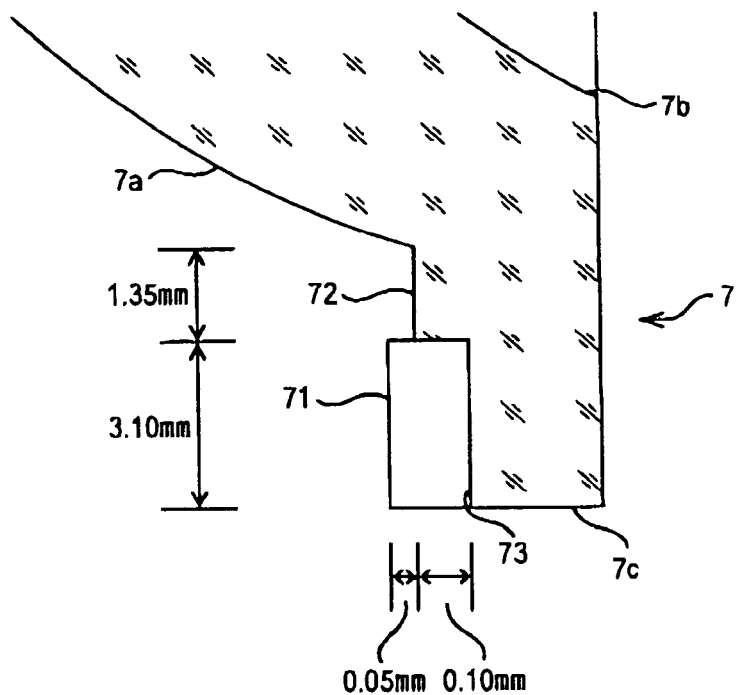
FIG. 18 is an enlarged sectional view of a fringe part of a lens of a sixth comparative example.
Figure 19:
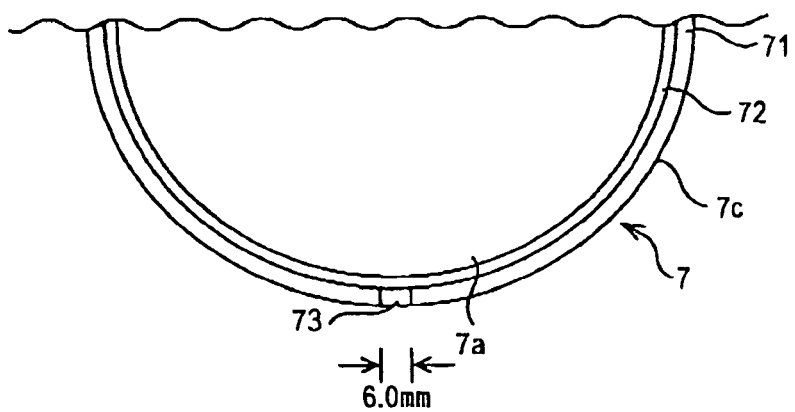
FIG. 19 is a front view of the lower half of the lens of the sixth comparative example when it is viewed from the left in FIG. 18.

FIG. 18 is an enlarged sectional view of the part of the flange 7c of the sixth comparative example and FIG. 19 is a front view of the lower half of the lens 7 in a pulling-up direction when it is viewed from the left in FIG. 18.

As shown in FIG. 18 and FIG. 19, the lens 7 of the fifth comparative example differs form the lens 1 of the embodiment in that a groove 73 of the flange 7c is formed so as to cut the outer ring area 71 only.

The differential step between the outer ring area 71 and the inner ring area 72 in the optical axis direction is equal to 0.05 mm, the depth of the groove 73 with reference to the inner ring area 72 is equal to 0.1 mm, and the width of the groove 73 in the tangential direction is equal to 6.0 mm.

When a solution of coating material was applied to the lens 7 of the sixth comparative example according to the above-described procedure, the width of puddle became 60 mm and the height of puddle became 3.5 mm.

SEVENTH COMPARATIVE EXAMPLE

Figure 20:
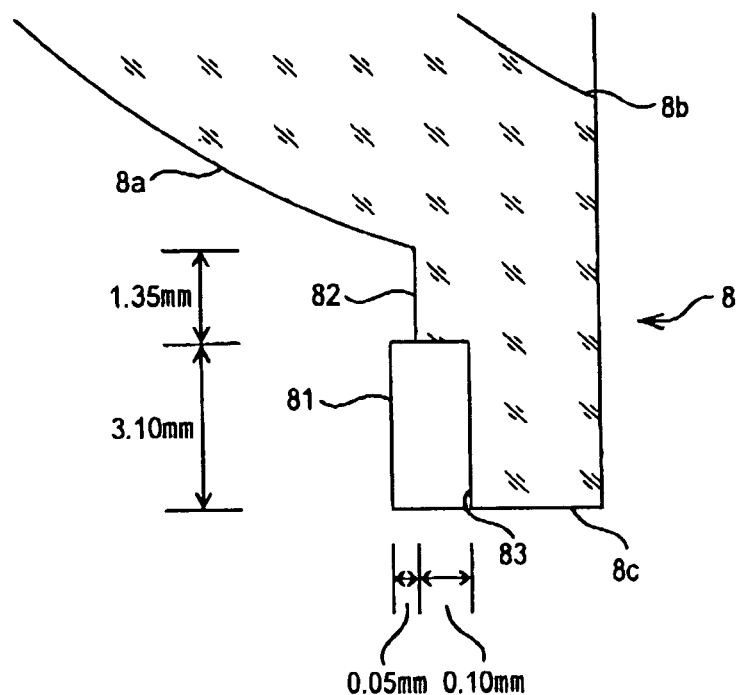
FIG. 20 is an enlarged sectional view of a fringe part of a lens of a seventh comparative example.
Figure 21:
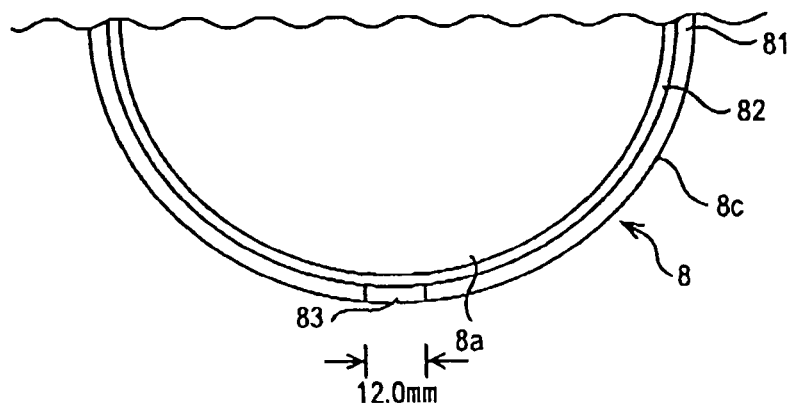
FIG. 21 is a front view of the lower half of the lens of the seventh comparative example when it is viewed from the left in FIG. 20.

FIG. 20 is an enlarged sectional view of the part of the flange 8c of the seventh comparative example and FIG. 21 is a front view of the lower half of the lens 8 in a pulling-up direction when it is viewed from the left in FIG. 20.

As shown in FIG. 20 and FIG. 21, the lens 8 of the seventh comparative example differs form the lens 1 of the embodiment in that a groove 83 of the flange 8c is formed so as to cut the outer ring area 81 only and the width of the groove 83 becomes larger.

The differential stop between the outer ring area 81 and the inner ring area 82 in the optical axis direction is equal to 0.05 mm, the depth of the groove 83 with reference to the inner ring area 82 is equal to 0.1 mm, and the width of the groove 83 in the tangential direction is equal to 12.0 mm.

When a solution of coating material was applied to the lens 8 of the seventh comparative example according to the above-described procedure, the width of puddle became 55 mm and the height of puddle became 3.0 mm.

It should be clear that the width of puddle is not so different between the embodiment (18 through 55 mm) and the comparative examples (20 through 60 mm), while the height of puddle in the embodiment (1.5 mm) is small enough as compared with that of the comparative examples (2.0 through 3.5 mm).

The above comparison result shows that the unnecessary solution, which collects at a lower area of the convex surface after immersion in the solution, does not drip from the lens when a groove is not formed or a groove is not extended from the outer edge of the convex surface.

On the contrary, when the groove 13 is extended from the outer edge of the convex surface 1a as the embodiment, the most of the unnecessary solution on the convex surface 1a drips from the lens 1 through the groove 13.

As described above, the present invention is able to provide a lens whose at least one lens surface is a convex surface with a flange around it, which is capable of reducing a size of a puddle formed on the convex surface after the lens is immersed in a solution of coating material.

The present disclosure relates to the subject matter contained in Japanese Patent Application No. 2002-289785, filed on Oct. 2, 2002, which is expressly incorporated herein by reference in its entirety.

What is claimed is:

1. A lens, comprising:
   a first lens surface;
   a second lens surface, at least one of said first and second lens surfaces being a convex surface; and
   a flange formed around the lens, projecting from said convex surface in a radial direction perpendicular to an optical axis,
   wherein said flange is provided with a groove radially extending from said convex surface to the outer edge of said flange, said groove being configured for allowing removal of excess coating solution applied to the lens.

2. The lens according to claim 1, wherein said flange includes an outer ring area and an inner ring area that are different in thickness in an optical axis direction, and wherein said groove is cut out of part of said outer and inner ring areas.

3. The lens according to claim 2, wherein the thickness of said outer ring area in the optical axis direction is larger than that of said inner ring area.

4. The lens according to claim 3, wherein a depth of said groove in the inner ring area is approximately twice the difference between the thickness of the outer ring area in the optical axis direction and the thickness of the inner ring area in the optical axis direction.

5. The lens according to claim 2, wherein a width of said outer ring area in the radial direction is larger than that of said inner ring area.

6. The lens according to claim 5, wherein the width of said outer ring area in the radial direction is more than twice and less than three times that of said inner ring area.

7. The lens according to claim 1, wherein a width of said groove in a tangential direction is larger than a width of said flange in the radial direction.

8. The lens according to claim 7, wherein the width of said groove in the tangential direction is smaller than twice the width of said flange in the radial direction.

9. A lens, comprising:
   a first lens surface;
   a second lens surface, at least one of said first and second lens surfaces being a convex surface; and
   a flange formed around the lens, projecting from said convex surface in a radial direction perpendicular to an optical axis, said flange including an outer ring area and an inner ring area that are different in thickness in an optical axis direction, the thickness of said outer ring area in the optical axis direction being larger than that of said inner ring area,
   wherein said flange is provided with a groove radially extending from said convex surface to the outer edge of said flange, said groove being cut out of part of said outer and inner ring areas.

10. A lens, comprising:
    a first lens surface;
    a second lens surface, at least one of said first and second lens surfaces being a convex surface; and
    a flange formed around the lens, projecting from said convex surface in a radial direction perpendicular to an optical axis, said flange including an outer ring area and an inner ring area that are different in thickness in an optical axis direction, a width of said outer ring area in the radial direction being larger than that of said inner ring area,
    wherein said flange is provided with a groove radially extending from said convex surface to the outer edge of said flange, said groove being cut out of part of said outer and inner ling areas.

11. A lens, comprising:
    a first lens surface;
    a second lens surface, at least one of said first and second lens surfaces being a convex surface; and
    a flange formed around the lens, projecting from said convex surface in a radial direction perpendicular to an optical axis,
    wherein said flange is provided with a groove radially extending from said convex surface to the outer edge of said flange, a width of said groove in a tangential direction being larger than a width of said flange in the radial direction.

* * * * *